(12) United States Patent
Sommerfeld et al.

(10) Patent No.: US 7,802,662 B2
(45) Date of Patent: Sep. 28, 2010

(54) SLACK ADJUSTER FOR RAILWAY VEHICLE BRAKE RIGGING

(75) Inventors: Howard Sommerfeld, Oak Forest, IL (US); Staffan Brandt, Wauconda, IL (US)

(73) Assignee: WABTEC Holding Corp., Wilmerding, PA (US)

( * ) Notice: Subject to any disclaimer, the term of this patent is extended or adjusted under 35 U.S.C. 154(b) by 456 days.

(21) Appl. No.: 11/899,445

(22) Filed: Sep. 6, 2007

(65) Prior Publication Data

US 2009/0065312 A1 Mar. 12, 2009

(51) Int. Cl.
*F16D 65/52* (2006.01)

(52) U.S. Cl. .................................. 188/197; 188/202

(58) Field of Classification Search ............. 188/196 D, 188/197, 202, 196 R, 193
See application file for complete search history.

(56) References Cited

U.S. PATENT DOCUMENTS

| 4,662,485 A | 5/1987 | Kanjo et al. |
| 6,003,643 A * | 12/1999 | Moore ........................ 188/197 |

* cited by examiner

*Primary Examiner*—Melanie Torres Williams
(74) *Attorney, Agent, or Firm*—James Ray & Assoc

(57) ABSTRACT

The present invention teaches a double-acting compression actuatable slack adjuster to adjust the slack in the brake rigging of a railway vehicle which includes a pair of elongated members movable with respect to each other in a longitudinal direction. A positioning device carrying a pair of opposed abutting surfaces is threadedly engaged with a threaded portion of the elongated rod. Pair of opposite facing abutment surfaces are positioned within the hollow housing. A first urging device is positioned to urge the positioning device into a disengaged position. A second urging device overcomes the force of the first urging device and urges an abutting surface on the positioning device into engagement with an adjacent abutment surface. A first overtravel control device is provided which is activated by a trigger device. A second overtravel control device is provided to prevent jamming condition of the positioning device with one of the abutment surfaces when the elongated rod is fully extended.

9 Claims, 3 Drawing Sheets

SLACK ADJUSTER FOR RAILWAY VEHICLE BRAKE RIGGING

CROSS-REFERENCE TO RELATED APPLICATIONS

This application is closely related to U.S. Pat. No. 4,662,485 which is assigned to the assignee of the present invention. The disclosure of U.S. Pat. No. 4,662,485 is hereby incorporated by reference thereto.

FIELD OF THE INVENTION

The present invention relates, in general, to a double-acting compression actuable slack adjuster assembly which automatically adjusts the slack in the brake rigging of a railway vehicle and, more particularly, this invention relates to a double-acting compression actuable slack adjuster assembly which includes an overtravel control mechanism preventing irreversible lock-up of the slack adjuster being incorrectly installed and adjusted.

BACKGROUND OF THE INVENTION

As is generally well known, slack adjuster assemblies have been employed to automatically adjust the slack in the brake rigging of a railway vehicle. A particular slack adjuster of a double-acting compression type has been manufactured by the assignee of the present invention and employed in a wide variety of railway applications. Such slack adjuster includes an elongated hollow housing member restrained against rotation and pivotally connectable at a first end thereof to such brake rigging. An elongated rod member, which is restrained against rotation and pivotally connectable at a first end thereof to such brake rigging, is also provided and has at least a threaded portion adjacent a second end thereof. The threaded portion of the rod member extends into and is reciprocally movable within the housing through a second end of the housing. A positioning means, such as a cone lock nut, movable between respective first abutting engagement, disengagement, and second abutting engagement positions is threadably engaged with the threaded portion of the rod member intermediate said ends thereof. The cone lock nut rotates about the threaded portion of the rod member when in the disengaged position thereby changing the length of the slack adjuster assembly by changing the relative longitudinal position between the housing and the rod member. A pair of opposite facing abutment surfaces positioned within a portion of the housing and a pair of opposed abutting surfaces carried by the cone lock nut for engaging respective adjacent abutment surfaces to resist rotation of the cone lock nut about the rod member when the cone lock nut is in one of the respective abutting engagement positions thereby retarding the change in relative longitudinal position between the housing and the rod member are provided. A first urging means is positioned between the cone lock nut and an abutment surface carried by the rod member for urging the cone lock nut into the disengaged position. A second urging means is positioned between the first end of the housing and the cone lock nut for overcoming a force applied by the first urging means and for urging the cone lock nut into the first abutting relationship position. An overtravel control means is positioned to reciprocally move in a longitudinal direction adjacent the first end of the housing and is engageable with the second urging means for reducing the force applied by the second urging means to less than the force applied by the first urging means, thereby allowing the cone lock nut to move to the disengaged position. An overtravel control actuating means is positioned to engage the overtravel control means for actuating the overtravel control means in response to the travel distance of a brake cylinder piston connected to such brake rigging. When the slack adjuster is triggered, the cone lock nut rotates with the sufficient speed and force that the abutting surface carried thereon frictionally engages against the abutment surface of the housing in second abutting relationship position. Such abutment surface is oriented toward the first end of the housing. In normal operation of the slack adjuster when this condition occurs, the second urging means is compressed slightly by the by the higher overtravel spring force and the cone lock nut moves from the second abutting relationship position. However, it has been found that when the slack adjuster is triggered and the elongated rod is allowed to fully extend due to improper adjustment during installation, the speed and inertia of the rotating cone lock nut is sufficient to exert greater than desirable force during contact with the abutment surface of the housing in the second abutting relationship position. Such greater than desirable contact force causes jamming condition, due to friction and, more importantly, causes operation of the slack adjuster to cease. Prior to the present invention, the jamming condition can be only corrected by manually rotating the portion of the housing disposed adjacent the first end thereof.

Therefore, there is a need for an improved slack adjuster which includes an overtravel control mechanism preventing irreversible lock-up of the slack adjuster being incorrectly installed and adjusted.

SUMMARY OF THE INVENTION

This invention provides a double-acting compression actuable slack adjuster to adjust the slack in a railway vehicle brake rigging. The slack adjuster assembly includes an elongated hollow housing member restrained against rotation and pivotally connectable at a first end thereof to such brake rigging. An elongated rod member, restrained against rotation and pivotally connectable at a first end thereof to such brake rigging, is also provided and has at least a threaded portion adjacent a second end thereof. The threaded portion of the rod member extends into and is reciprocally movable within the housing through a second end of the housing. A positioning means movable between respective first abutting engagement, disengagement, and second abutting engagement positions is threadably engaged with the threaded portion of the rod member intermediate the ends thereof. The positioning means rotates about the threaded portion of the rod member when in the disengaged position thereby changing the length of the slack adjuster assembly by changing the relative longitudinal position between the housing and the rod member. A pair of opposite facing abutment surfaces positioned within a portion of the housing and a pair of opposed abutting surfaces carried by the positioning means for engaging respective adjacent abutment surfaces to resist rotation of the positioning means about the rod member when the positioning means is in one of the respective abutting engagement positions thereby retarding the change in relative longitudinal position between the housing and the rod member are provided. A first urging means is positioned between the positioning means and an abutment surface carried by the rod member for urging the positioning means into the disengaged position. A second urging means is positioned between the first end of the housing and the positioning means for overcoming a force applied by the first urging means and for urging the positioning means into the first abutting relationship position. A first overtravel control means is positioned to reciprocally move in a longitudinal direction adjacent the first end of the housing and is engageable with the second urging means for reducing the force applied by the second urging means to less than the force applied by the first urging means, thereby allowing the positioning means to move to the disengaged position. An overtravel control actuating means is positioned to engage the first overtravel control means for actuating the first overtravel control means in response to the travel distance of a brake force applying member connected to such brake rigging. A second overtravel control means is positioned in close proximity to the second end of the elongated hollow cylindrical housing member for reducing a frictional force generated during engagement of the respective abutment and abutting surfaces when the positioning means is in the second abutting engagement position and for preventing a jamming condition between the respective abutment and abutting surfaces when the elongated rod member is fully extended

OBJECTS OF THE INVENTION

It is, therefore, one of the primary objects of the present invention to provide a double-acting compression actuatable slack adjuster assembly to automatically adjust the slack occurring in the brake rigging of a railway vehicle and which can function as a force-transmitting member in such brake rigging.

Another object of the present invention is to provide a double-acting compression actuatable slack adjuster assembly to adjust the slack in a railway vehicle brake rigging which includes an overtravel control mechanism preventing irreversible lock-up of the slack adjuster being incorrectly installed and adjusted.

Yet another object of the present invention is to provide a double-acting compression actuatable slack adjuster assembly to adjust the slack in a railway vehicle brake rigging which includes an overtravel control mechanism that can be triggered in a number of ways from a measured travel distance of the brake cylinder piston rod.

A further object of the present invention is to provide a double-acting compression actuatable slack adjuster assembly which can be installed in the brake rigging of a railway vehicle in either one of two positions thereby permitting not only greater flexibility but also reliability in placement of the trigger mechanism which responds to measured brake cylinder piston rod travel distance.

An additional object of the present invention is to provide a double-acting compression actuatable slack adjuster assembly in which all of the force urging means are always maintained in compression.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
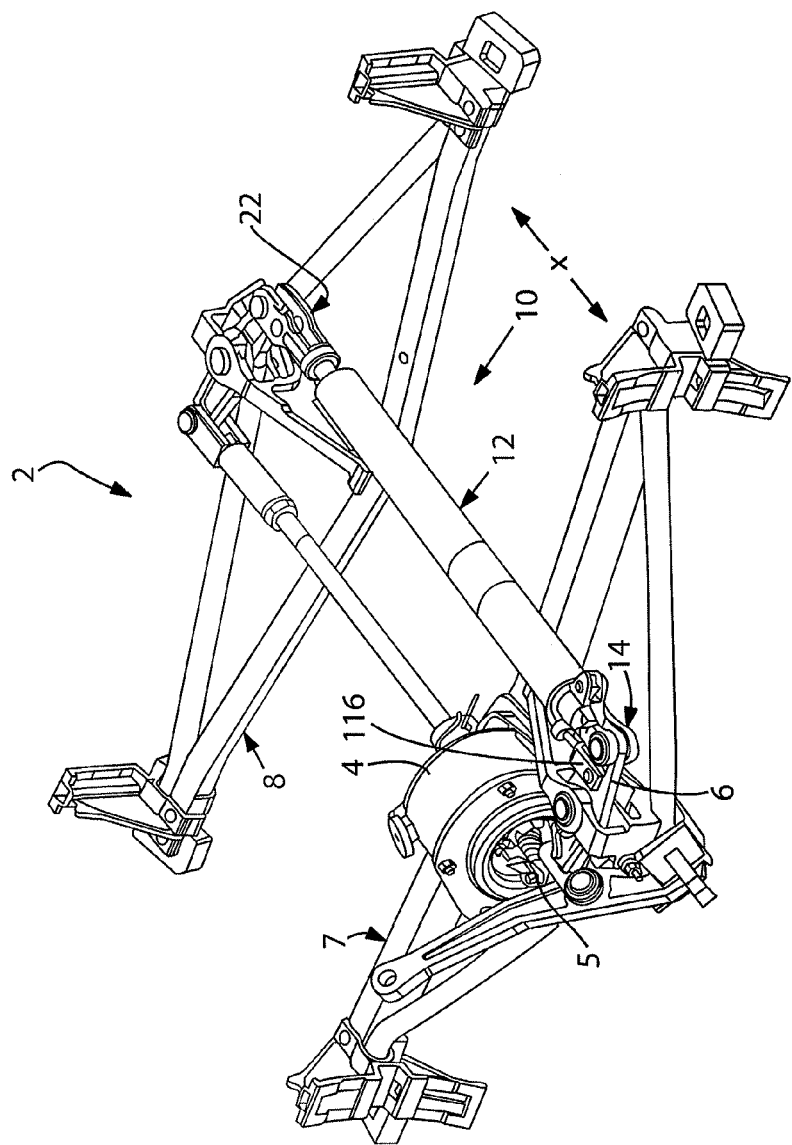
FIG. 1 is a perspective view of a double-acting compression actuatable slack adjuster assembly of the present invention illustrated in combination with a brake rigging of a railway vehicle.

Prior to proceeding to the more detailed description of the present invention, it should be noted that, for the sake of clarity and understanding, identical components which have identical functions have been identified with identical reference numerals throughout the several views illustrated in the drawing figures.

The structure and use of the present invention will be illustrated in combination with a double-acting compression actuatable slack adjuster assembly, generally designated as 10, which is taught in the U.S. Pat. No. 4,662,485 assigned to the assignee of the present invention. The disclosure of U.S. Pat. No. 4,662,485 is incorporated into this document by reference thereto. The double-acting compression actuatable slack adjuster assembly 10 is installed on a truck-mounted brake rigging, generally designated as 2, of a railway vehicle (not shown). The truck-mounted brake rigging illustrated in FIG. 1 is of a type as manufactured by the assignee of the present invention under TMX® brand.

Now referring to FIGS. 2-8, the double-acting compression actuatable slack adjuster assembly 10 includes an elongated hollow housing member, generally designated 12. The housing member 12 is restrained against rotation and is pivotally connectable at a first end 14 thereof to the brake rigging 2 of the railway vehicle (not shown) by a first eye portion 16 having an aperture 18 formed therethrough.

Figure 7:
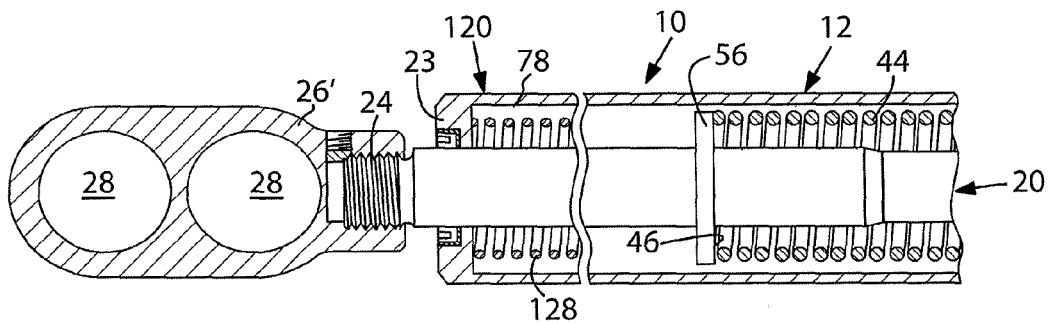
FIG. 7 is a partial longitudinal cross-sectional view of the double-acting compression actuatable slack adjuster assembly showing an alternative embodiment of the overtravel protection means.

An elongated rod member, generally designated as 20, is positioned for reciprocal movement within the housing member 12 through a wall 23 of the second end 22 of housing member 12. Rod member 20 is restrained against rotation and is pivotally connected at a first end 24 thereof to the railway vehicle brake rigging 2 by a rear eye portion 26 having an aperture 28 formed therethrough or by a rear portion 26' having a pair of spaced apart apertures 28 formed therethrough, as best shown in FIG. 7, for accommodating different brake rigging construction corresponding to a capacity of the railway vehicle truck (not shown). The rod member 20 has a threaded portion 30 adjacent a second end 32 thereof. Threaded portion 30 extends from the second end 32 of rod member 20 for a predetermined length and is contained within the housing member 12. Also adjacent the second end 32 of rod member 20 is a means, such as a collet 33, to maintain the rod member 20 in substantial coaxial alignment with the housing member 12. Collet 33 is held in place by a retainer ring 35.

A positioning means, generally designated as 34, is threadedly engaged with the threaded portion 30 of the rod member 20 intermediate the ends thereof. The positioning means 34 is movable between respective first abutting engagement, disengagement and second abutting engagement positions. The positioning means 34 rotates about the threaded portion 30 of rod member 20 when in the disengaged position and thereby changes the length of the slack adjuster assembly 10 by changing the relative longitudinal positions between the housing member 12 and the rod member 20.

A pair of opposite facing abutment surfaces 36 and 38 are positioned within a portion of the housing member 12 intermediate the ends thereof for engagement by a pair of opposed abutting surfaces 40 and 42 carried by the positioning means 34. Abutment surface 36 engages abutting surface 40 in the above-mentioned first abutting engagement position and abutment surface 38 engages abutting surface 42 in the second abutting engagement position. During engagement of respective adjacent abutment surfaces, i.e., 36 with 40 or 38 with 42, rotation of the positioning means 34 about the threaded portion 30 of rod member 20 is resisted and thereby retards the change in relative longitudinal position between the housing member 12 and the rod member 20.

A first urging means, preferably a spring 44, is positioned between the positioning means 34 and an abutment surface 46, carried by the rod member 20, to urge the positioning means 34 into the above-mentioned disengaged position. It should be understood by those skilled in the art that the first urging means could be a fluid cylinder, such as a pneumatic or hydraulic cylinder (not shown).

A second urging means, preferably a spring 48, is positioned between an abutment surface 50 near the first end 14 of the housing member 12 and the positioning means 34. As mentioned above, the second urging means could also be a fluid-operated cylinder (not shown). Typically, the second spring 48 is stronger than the first spring 44 so as to overcome the force applied by the first spring 44 and therefore urge the positioning means 34 to the left, as shown in the drawing, with the consequent engagement of abutment surfaces 36 and 40 which is the first abutting relationship position.

A first overtravel control mechanism, generally designated as 52, is positioned to reciprocally move in a longitudinal direction adjacent the first end 14 of the housing member 12. Overtravel control means 52 is engageable with the second spring 48 in order to reduce the force being applied to such second spring 48 to an amount which is less than the force being applied by the first spring 44. This will allow the positioning means 34 to move to the disengaged position.

An overtravel actuating means, generally designated as 100, is positioned to engage the overtravel control means 52 in order to activate the overtravel control means 52 in response to the travel distance of a force applying member 5 of a brake actuator 4 of the brake rigging 2. In the presently preferred embodiment of the invention, the overtravel actuating means 54 includes a lever 102 which is pivotally connected to a bifurcated portion 104 of the housing member 12. Accordingly, an aperture 106 is formed through each portion 104 and has axis thereof which is disposed generally vertically when the slack adjuster 10 is installed in the brake rigging 2. The aperture 106 is aligned with a complimentary aperture 108 formed through the first end of the lever 102. A simple pin 110 and a cutter pin 112, inserted through an aperture (not shown) formed in one end of the pin 110, are then used to achieve such pivotal connection. The second end of the lever 102 extends past the elongated housing member 12 and has an aperture 114 which is formed therein and which has axis thereof disposed generally horizontally when the slack adjuster 10 is installed in the brake rigging 2. The aperture 114 is sized to receive a threaded portion 118 of the control member 116 which has a bifurcated portion 117 axially aligned with the threaded portion 118. A pair of nuts 130 and 132 are used to attach the second end of the lever 102 to the control member 116. The control member 116 has an aperture 134 formed through bifurcated portion 117 for attachment to the force transmitting linkage 6 of the brake rigging 2. An abutment portion 105 is formed intermediate the ends of the lever 102 for engagement with the overtravel control means 52. A reference point is established during movement of the force applying member 5 of the brake actuator 4 and compression of the spring is triggered by the lever 102 when this reference point is exceeded.

In the presently preferred embodiment of the invention, the abutment surface 46 is carried by a first spring seat 56 secured to rod member 20 in a permanent fashion such as by welding, and the first spring 44 is caged between the first spring seat 56 and the positioning means 34. The second spring 48 is caged between the abutment surface 50 located at the first end 14 of the housing member 12, and an abutment surface 58 closely adjacent one end 60 of the overtravel control means 52. The abutment surface 58 is preferably carried by a second spring seat 62. The second spring seat 62 engages a first ledge portion 64 (FIG. 5) which extends outwardly from the outer periphery of the overtravel control means 52 closely adjacent the end 60 on an opposed side 66 of spring seat 62.

The load rating of the second spring 48 is greater than the load rating of the first spring 44 and is preferably in the range of at least between about 2.0 and 3.0 times greater. On the other hand, the free height of the first spring 44 is greater than the second spring 48 and preferably it has a free height of at least between about 1.5 and 1.8 times greater free height.

Figure 3:
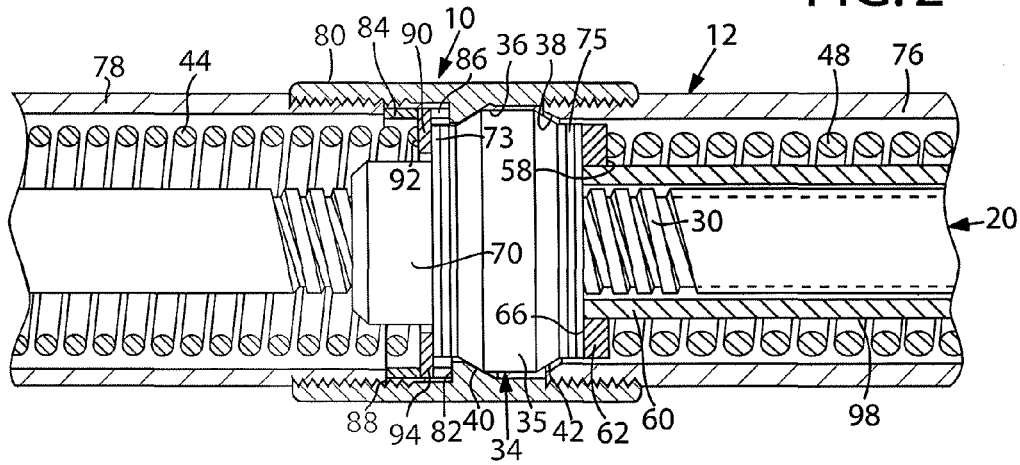
Figure 5:
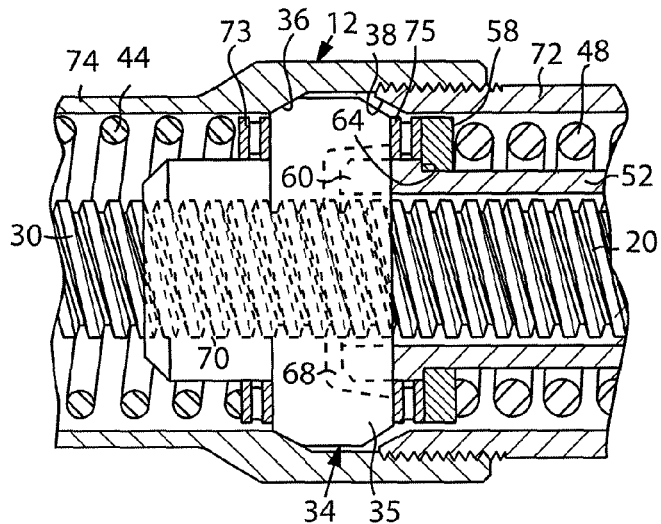
FIG. 5 is a fragmentary view in cross-section which shows a two-piece housing connection for a double-acting compression actuatable slack adjuster assembly according to the present invention.
Figure 6:
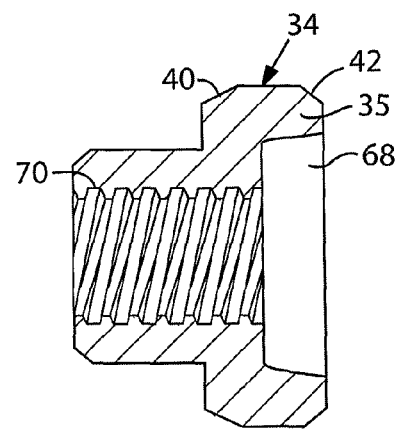
FIG. 6 is a cross-sectional view of a presently preferred positioning means used in the double-acting compression actuatable slack adjuster assembly of the present invention.
Figure 8:
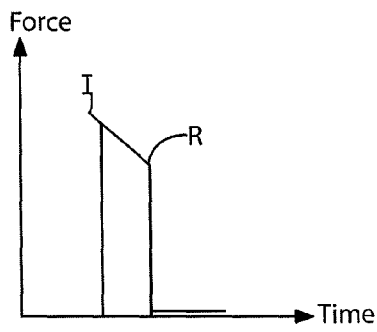
FIG. 8 is a force/time curve of the overtravel protection means of FIG. 2.

As shown in FIGS. 3, 5 and 6 and in accordance with the present embodiment, the positioning means 34 is a cone lock nut 35. Cone lock nut 35 includes a recessed area 68 for receiving the end 60 of overtravel control means 52. Cone lock nut 35 also has an extended and internally threaded portion 70 which extends into first spring 44 adjacent one end. Extended portion 70 provides a greater threaded portion for cone lock nut 35 and controls somewhat the speed of rotation of such cone lock nut 35.

In the presently preferred practice of the invention, a pair of thrust bearings 73 and 75 are placed in contact with a respective side of the cone lock nut 35 to permit free rotation of such cone lock nut 35 about the threaded portion of rod member 20.

As best shown in FIG. 5, the elongated hollow housing member 12 includes a first housing portion 72 which houses a portion of the threaded portion 30 of the rod member 20, the overtravel control means 52, and the second spring 48. The housing member 12 also includes a second housing portion 74 which is removably engaged with first housing portion 72. Second housing portion 74 houses a portion of the rod member 20 including the remaining portion of the threaded portion 30 of rod member 20 and the first spring 44. The cone lock nut 35 is positioned substantially at the juncture of first housing portion 72 and second housing portion 74. The first housing portion 72 carries one of the opposite facing abutment surfaces 38, and the second housing portion 74 carries the other of the opposite facing abutment surfaces 36.

Figure 2:
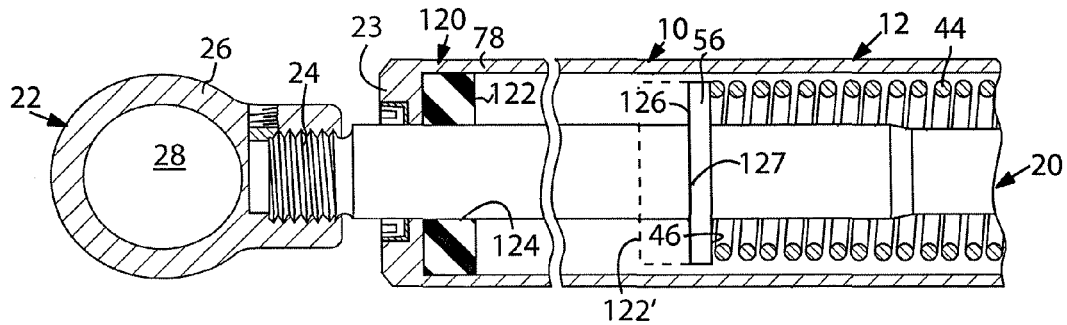
FIGS. 2-4 are a longitudinal cross-sectional view of the double-acting compression actuatable slack adjuster assembly showing a presently preferred embodiment of the invention.
Figure 4:
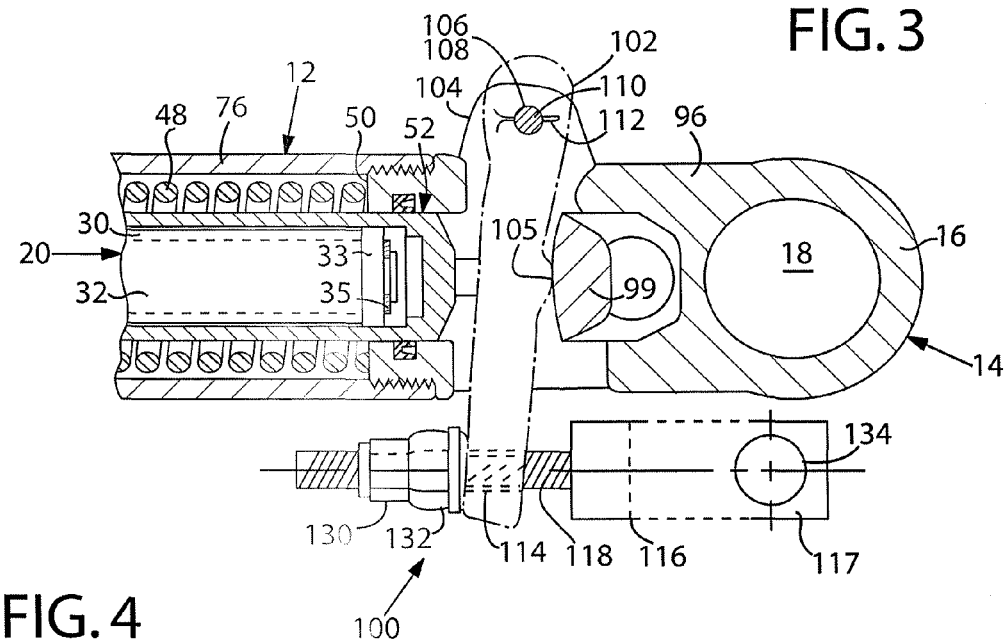

The presently preferred housing member 12, shown in FIGS. 2-4, includes a first housing portion 76 which houses a portion of the threaded portion 30 of rod member 20, the overtravel control means 52 and the second spring 48. Housing member 12 also includes a second housing portion 78 which houses a portion of the rod member 20 including the remaining portion of the threaded portion 30 and the first spring 44. A third housing portion 80 couples the first housing portion 76 with the second housing portion 78. In the housing member 12 arrangement, shown in FIGS. 2-4, the first housing portion 76 carries one of the pair of opposite facing abutment surfaces 38 and the third housing portion 80 carries the other of the opposite facing abutment surfaces 36. The third housing portion 80 includes a second ledge portion 82 extending inwardly and facing the second housing portion 78.

A sleeve member 84 having at least one longitudinal guide slot 86 formed therein is tightly positioned between the second ledge portion 82 and one end 88 of the second housing portion 78. A third spring seat 90 is positioned for reciprocal movement intermediate one end 92 of the first spring 44 and the thrust bearing 73 adjacent cone lock nut 35. The third spring seat 90 includes at least one lug portion 94 which extends in an outwardly direction from the outer periphery of the spring seat 90 to cooperate with the guide slot 86 to prevent windup of the first spring 44.

In all of the presently preferred embodiments of the invention, the housing member 12 is cylindrical in shape. An elongated hollow cylindrical portion 96 is removably engaged intermediate the end 14 and first housing portion 76 or 72 which allows reciprocal movement of the overtravel control means 52. There is at least one opening through the wall of the cylindrical portion 96 to permit the actuating means 102 to engage the overtravel control means. The eye portion 16 is formed as a single-piece casting with the cylindrical portion 96. Eye portion 16 allowing such pivotal connection and at the same time restraining the first end 14 against rotation.

The overtravel control means 52 includes an elongated hollow cylindrical portion 98 having the first ledge portion 64 at one end 60 positioned between the threaded portion 30 of the rod member 20 and the second spring 48. A generally solid portion 99 is secured to the overtravel control cylindrical portion 98 and is reciprocally movable within the cylindrical portion 96 connected to end 14.

In operation, when it is required to apply brakes, the brake actuator 4 of the brake rigging 2 is energized enabling its force applying member 5 to extend and causing the brake beams 7, 8 to move in a direction "X". At predetermined travel of the force applying member 5, as the brake shoes (not shown) contact the wheel (not shown), the actuating lever 102 of the overtravel actuating means 100 which is connected to the force transmitting linkage 6 of the brake rigging 2 is activated and "triggers" the slack adjuster 10 by moving the overtravel control means 52 in a direction to compress spring 48. Any further travel of the force applying member 5 causes a compression force through the elongated rod member 20, at the same time compressing spring 48, thereby allowing spring 44 to move the cone lock nut 35 from the abutment surface 36 and further allowing the abutting surface 42 carried thereon to frictionally engage abutment surface 38 of housing 12 and lock-up as a solid rod in compression, causing no changes. In normal operation of the slack adjuster 10 when this condition occurs, the second spring 48 is compressed slightly by the by the higher overtravel spring force and the cone lock nut 35 moves from the second abutting relationship position when the brake application is discontinued and when the brake actuator 4 is deenergized. However, it has been found that when the slack adjuster 10 is triggered and the elongated rod member 20 is allowed to fully extend due to improper adjustment during installation or lack of connection of the second end 22 to the brake rigging 2, the speed and inertia of the rotating cone lock nut 35 is sufficient to exert greater than desirable force during frictional contact between abutting surface 42 and the abutment surface 38 of the housing 12 in the second abutting relationship position aided by the locking effect of the internally threaded portion 70 of the cone lock nut 35 against the threaded portion 30 of the rod member 20. Such greater than desirable contact force causes jamming condition, due to friction and, more importantly, causes operation of the slack adjuster 10 to cease. Prior to the present invention, the jamming condition can be only corrected by manually rotating the second end 22 of the slack adjuster 10.

To prevent the jamming condition between respective abutting surface 42 and abutment surface 38, the slack adjuster 10 includes a second overtravel control means, generally designated as 120, which is positioned in close proximity to the second end 22 of the elongated hollow cylindrical housing member 12 for reducing a frictional force generated during engagement of such abutting surface 42 and abutment surface 38 when the cone lock nut 35 moves into the second abutting position. In the presently preferred embodiment of the invention, the second overtravel means 120 is at least one resilient member positioned within the elongated hollow cylindrical housing member 12 and caged between the wall 23 of the elongated hollow cylindrical housing member 12 and the first spring seat 56. Preferably, as best shown in FIG. 2, such at least one resilient member is an elastomeric disk-like member 122 having each of a predetermined thickness and a predetermined hardness. The disk-like member 122 has an aperture 124 axially formed therein for receiving the elongated rod member 20. The presently preferred material of the disk-like member 122 is thermoplastic elastomer and, more particularly, polyester elastomer such as the one marketed under the trade name "Hytrel" by E.I. Du Pont. If required, such disk-like member 122 may be secured to the surface 126 of the first spring seat 56, as shown by 122', by way of an adhesive 127.

Alternatively, as shown in FIG. 7, the second overtravel means 120 is at least one coiled spring 128 positioned within the hollow cylindrical housing member 12 and caged between the wall 23 of the elongated hollow cylindrical housing member 12 and the first spring seat 56.

Now, when the elongated rod member 20 is fully extended, the disk-like member 122 will compress slightly upon impact with the surface 126 of the first spring seat 56. As the disk-like member 122 compresses the impact energy is quickly absorbed and is initially stored therewithin, as indicated by reference letter "I" in FIG. 8, thus preventing jamming condition, due to friction, between abutting surface 42 and abutment surface 38. Preferably, the thickness and hardness of the disk-like member 122 are preselected for specific construction of the slack adjuster to absorb the impact energy just prior to contact between abutting surface 42 and abutment surface 38. After duration of time, the impact energy is released, as indicated by reference letter "R" in FIG. 8, enabling normal operation of the slack adjuster 10 wherein the first spring 44 slightly extends the rod member 20 and the abutting surface 42 contacts the abutment surface 38 with the desired friction force preventing jamming condition.

The presently preferred thickness of the disk-like member 122 for use with the above described slack adjuster 10 is between about 0.12 inches and about 0.128 inches and the presently preferred hardness is about 40 durometer.

Although the present invention has been shown in terms of employing the slack adjuster 10 with the truck-mounted brake rigging 2 of FIG. 1, it will be apparent to those skilled in the art, that the present invention may be applied to other truck-mounted or car mounted brake riggings.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A double-acting compression actuatable slack adjuster for adjusting the slack in a railway vehicle brake linkage, said slack adjuster comprising:
   (a) an elongated hollow cylindrical housing member restrained against rotation and pivotally connectable at a first end thereof;
   (b) an elongated rod member restrained against said rotation and pivotally connectable at a first end thereof, said rod member having at least a portion thereof threaded, said threaded portion of said rod member extending into said housing member through a second end of said housing member;
   (c) a pair of opposite facing abutment surfaces positioned within a portion of said housing member;
   (d) a cone lock nut positioning means threadedly engaged with said threaded portion of said rod member intermediate a first and second end thereof, said positioning means axially movable between said abutment surfaces into respective first, second, and third positions for rotating about said threaded portion of said rod member when said positioning means is in said second position, thereby changing the length of said slack adjuster assembly by changing the relative longitudinal position between said housing member and said rod member;
   (e) a pair of opposed abutting surfaces carried by said positioning means for engaging respective adjacent abutment surfaces on said housing member to resist rotation of said positioning means about said rod member when said positioning means is in one of said first and said third positions;
   (f) a first spring urging means caged between said positioning means and a first spring seat carried by said rod member for urging said positioning means into said second position in disengagement from said abutment surfaces on said housing member;
   (g) a second spring urging means caged between said first end of said housing an abutment surface closely adjacent one end of a second spring seat for overcoming a force applied by said first urging means and for urging said positioning means into said first position, said second spring urging means having a load rating at least between about 2.0 and 3.0 times greater than the load rating of said first spring urging means;
   (h) a first overtravel control means having a portion thereof disposed axially reciprocal within said first end of said housing member for reducing a force applied by said second spring urging means to a force less than that applied by said first spring urging means, allowing said positioning means to move to said second position in response to overtravel, said first overtravel control means having a first ledge portion extending outwardly from an outer periphery thereof closely adjacent said one end which is engageable with said second spring seat;
   (i) an elongated hollow cylindrical portion removably engageable with said first end of said housing member for allowing reciprocal movement of said first overtravel control means;
   (j) at least one opening formed through a wall of said cylindrical portion;
   (k) an actuating means operable for actuating said first overtravel control means in response to a travel distance of a force applying member of the brake rigging, said actuating means comprising:
      (i) a bifurcated portion formed on said elongated hollow cylindrical housing member adjacent to and spaced from said first end thereof and having a first aperture formed therethrough, said first aperture having axis thereof being disposed generally vertically when said slack adjuster is installed in the brake rigging,
      (ii) a lever which has a first end thereof positioned within said bifurcated portion, a second end which extends through said at least one opening formed through a wall of said cylindrical portion past said elongated hollow cylindrical housing member, and an abutment which is formed intermediate said first and said second ends of said lever and which engages said first overtravel control means, said first end having a second aperture formed therethrough and aligned with said first aperture of said bifurcated portion, said second end has a third aperture formed therethrough, said third aperture having axis thereof being disposed generally horizontally when said slack adjuster is installed in the brake rigging,
      (iii) a pin inserted through said first and said second aperture and pivotally connecting said lever to said bifurcated portion, and
      (iv) a control member having a threaded portion received within said third aperture of said second end of said lever and connected thereto with a threaded fastener and a bifurcated portion being axially aligned with said threaded portion and having a forth aperture formed therethrough;
   (l) an eye portion formed as a single-piece casting with said cylindrical portion for pivotally connecting and restraining against rotation of said first end of said housing member; and
   (m) a second overtravel control means positioned in close proximity to said second end of said elongated hollow cylindrical housing member for reducing a frictional force generated during engagement of said respective abutment and abutting surfaces when said positioning means is in said second abutting engagement position and for preventing a jamming condition between said respective abutment and abutting surfaces causing operation of said slack adjuster to cease.

2. The slack adjuster, according to claim 1, wherein said second overtravel means is at least one resilient member positioned within said hollow cylindrical housing member and caged between said second end of said elongated hollow cylindrical housing member and said first spring seat.

3. The slack adjuster, according to claim 2, wherein said at least one resilient member is an elastomeric disk-like member which has each of a predetermined thickness and a predetermined hardness and which is manufactured from a predetermined material having a predetermined hardness.

4. The slack adjuster, according to claim 3, wherein said predetermined material is a thermoplastic elastomer.

5. The slack adjuster, according to claim 3, wherein said predetermined hardness is about 40 durometer.

6. The slack adjuster, according to claim 1, wherein said second overtravel means is at least one resilient member which is secured to said first spring seat and which is positioned within said hollow cylindrical housing member between said second end of said elongated hollow cylindrical housing member.

7. The slack adjuster, according to claim 1, wherein said second overtravel means is at least one coiled spring positioned within said hollow cylindrical housing member and caged between said second end of said elongated hollow cylindrical housing member and said first spring seat.

8. The slack adjuster, according to claim 1, wherein said slack adjuster further includes a member which has a threaded bore for threadable connection to said first end of said elongated rod member and a pair of spaced apart aperture formed therethrough for pivotally connecting said first end of said elongated rod member to the railway vehicle brake rigging and for restraining said elongated rod member against rotation, whereby said pair of spaced apart apertures enables said slack adjuster to accommodate different brake rigging constructions corresponding to a capacity of the railway vehicle truck.

9. A double-acting compression actuatable slack adjuster for adjusting the slack in a railway vehicle brake linkage, said slack adjuster comprising:
- (a) an elongated hollow cylindrical housing member restrained against rotation and pivotally connectable at a first end thereof;
- (b) an elongated rod member restrained against said rotation and pivotally connectable at a first end thereof, said rod member having at least a portion thereof threaded, said threaded portion of said rod member extending into said housing member through a second end of said housing member;
- (c) a pair of opposite facing abutment surfaces positioned within a portion of said housing member;
- (d) a cone lock nut positioning means threadedly engaged with said threaded portion of said rod member intermediate a first and second end thereof, said positioning means axially movable between said abutment surfaces into respective first, second, and third positions for rotating about said threaded portion of said rod member when said positioning means is in said second position, thereby changing the length of said slack adjuster assembly by changing the relative longitudinal position between said housing member and said rod member;
- (e) a pair of opposed abutting surfaces carried by said positioning means for engaging respective adjacent abutment surfaces on said housing member to resist rotation of said positioning means about said rod member when said cone lock nut positioning means is in one of said first and said third positions;
- (f) a first spring urging means caged between said positioning means and a first spring seat carried by said rod member for urging said cone lock nut positioning means into said second position in disengagement from said abutment surfaces on said housing member;
- (g) a second spring urging means caged between said first end of said housing an abutment surface closely adjacent one end of a second spring seat for overcoming a force applied by said first urging means and for urging said cone lock nut positioning means into said first position, said second spring urging means having a load rating at least between about 2.0 and 3.0 times greater than the load rating of said first spring urging means;
- (h) an overtravel control having a portion thereof disposed axially for reciprocal movement within said first end of said housing member to reduce a force applied by said second spring urging means to a force less than that applied by said first spring urging means, allowing said cone lock nut positioning means to move to said second position in response to overtravel, said overtravel control having a first ledge portion extending outwardly from an outer periphery thereof closely adjacent said one end which is engageable with said second spring seat;
- (i) an elongated hollow cylindrical portion removably engageable with said first end of said housing member for allowing said reciprocal movement of said overtravel control;
- (j) at least one opening formed through a wall of said cylindrical portion;
- (k) a bifurcated portion formed on said elongated hollow cylindrical housing member adjacent to and spaced from said first end thereof and having a first aperture formed therethrough, said first aperture having axis thereof being disposed generally vertically when said slack adjuster is installed in the brake rigging;
- (l) a lever having each of a first end thereof positioned within said bifurcated portion, a second end thereof extending through said at least one opening formed through a wall of said cylindrical portion past said elongated hollow cylindrical housing member, and an abutment formed intermediate said first and said second ends of said lever and engaging said overtravel control, said first end having a second aperture formed therethrough and aligned with said first aperture of said bifurcated portion, said second end having a third aperture formed therethrough, said third aperture having axis thereof being disposed generally horizontally when said slack adjuster is installed in the brake rigging;
- (m) a pin inserted through said first and said second aperture;
- (n) a control member having a threaded portion received within said third aperture of said second end of said lever and connected thereto with a threaded fastener and a bifurcated portion being axially aligned with said threaded portion and having a forth aperture formed therethrough; and
- (o) an eye portion formed as a single-piece casting with said cylindrical portion.

\* \* \* \* \*